(12) United States Patent
Naito et al.

(10) Patent No.: US 11,893,110 B2
(45) Date of Patent: Feb. 6, 2024

(54) ATTACK ESTIMATION DEVICE, ATTACK ESTIMATION METHOD, AND ATTACK ESTIMATION PROGRAM

(71) Applicant: MITSUBISHI ELECTRIC CORPORATION, Tokyo (JP)

(72) Inventors: Hisashi Naito, Tokyo (JP); Kiyoto Kawauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 324 days.

(21) Appl. No.: 17/386,169

(22) Filed: Jul. 27, 2021

(65) Prior Publication Data

US 2021/0357501 A1 Nov. 18, 2021

Related U.S. Application Data

(63) Continuation of application No. PCT/JP2019/010044, filed on Mar. 12, 2019.

(51) Int. Cl.
*G06F 21/55* (2013.01)
*G06F 11/14* (2006.01)

(52) U.S. Cl.
CPC ........ *G06F 21/552* (2013.01); *G06F 11/1415* (2013.01); *G06F 2201/86* (2013.01); *G06F 2221/034* (2013.01)

(58) Field of Classification Search
CPC ... H04W 12/069; H04W 12/04; H04W 76/11; H04W 84/12; H04W 80/04
See application file for complete search history.

(56) References Cited

U.S. PATENT DOCUMENTS 9,438,623 B1 * 9/2016 Thioux .................... G06F 21/52
9,894,090 B2 2/2018 Hebert et al.
(Continued)

FOREIGN PATENT DOCUMENTS

| JP | 5406195 B2 | 2/2014 |
| JP | 6000495 B2 | 9/2016 |
| WO | WO 2009/047113 A1 | 4/2009 |

OTHER PUBLICATIONS

Godefroy et al., "Automatic generation of correlation rules to detect complex attack scenarios", Information Assurance and Security (IAS), 2014 10th International Conference on. IEEE, 2014, Total 7 pages.

(Continued)

*Primary Examiner* — Khalid M Almaghayreh
(74) *Attorney, Agent, or Firm* — Birch, Stewart, Kolasch & Birch, LLP

(57) ABSTRACT

An attack estimation device includes a storage unit configured to hold an attack tree, an abstract attack tree, and log check management information, and a prediction unit configured to predict, when a detection alert is received, a range of compromise from the attack by referring to the information in the storage unit. The prediction unit is configured to: determine that an attack of an unknown pattern has occurred as the attack when indicators of compromise that correspond to the attack are not successfully identified; identify an abstract attack name by referring to the abstract attack tree; and predict a range of compromise from the attack of an unknown pattern by identifying a device in which indicators of the attack of an unknown pattern are likely to be left, and by identifying a specific place in the log of the identified device, by referring to the log check management information.

4 Claims, 9 Drawing Sheets

(56) References Cited

U.S. PATENT DOCUMENTS

| | | | |
|---|---|---|---|
| 9,916,445 B2 | 3/2018 | Ijiro et al. | |
| 10,530,810 B2* | 1/2020 | Ettema | G06F 21/53 |
| 2013/0318616 A1* | 11/2013 | Christodorescu | G06F 21/552 |
| | | | 726/25 |
| 2018/0004942 A1* | 1/2018 | Martin | G06F 21/554 |
| 2018/0004958 A1* | 1/2018 | Reinecke | G06F 21/566 |
| 2018/0322283 A1* | 11/2018 | Puri | G06F 16/254 |
| 2019/0132344 A1* | 5/2019 | Lem | G06N 20/00 |
| 2019/0222604 A1* | 7/2019 | Vaidya | H04L 63/1416 |
| 2019/0238583 A1* | 8/2019 | Vaidya | H04L 41/145 |
| 2020/0137084 A1* | 4/2020 | Roy | H04L 63/0236 |
| 2020/0336497 A1* | 10/2020 | Seul | H04L 63/1433 |

OTHER PUBLICATIONS

Japanese Office Action for application No. 2021-504681 dated Apr. 27, 2021.
Schneier, "Attach trees: modeling security threats", Dr. Dobb's Journal, Dec. 1999, pp. 1-9.

* cited by examiner 207 (ATTACK TREE STORAGE UNIT)

| ID | From | To | ATTACK METHOD | ATTACK METHOD ID | INDICATORS OF COMPROMISE(IOC) |
|---|---|---|---|---|---|
| 1 | E | - | DELETE CUSTOMER INFORMATION | D1 | - |
| 2 | C | E | INTRUDE BY USING "OS VULNERABILITY X" | D2 | FILE PATH : ... |
| 3 | D | E | INTRUDE BY USING "OS VULNERABILITY X" | D2 | FILE PATH : ... |
| 4 | A | C | INTRUDE BY USING "OS VULNERABILITY Y" | D3 | FILE PATH : ... |
| 5 | A | D | INTRUDE BY USING "SOFTWARE VULNERABILITY Z" | D4 | SOFTWARE NAME (VERSION) : Z(1.0.1 ~ 1.1.0)<br>FILE PATH : C:¥Program Files¥ ... |
| 6 | A | - | EXECUTION OF AND INFECTION WITH "MALWARE P" | D5 | FILE PATH : C:¥tmp¥malware.exe<br>REGISTRY :<br>HKEY_CURRENT_USER¥Software¥Microsoft¥Windows¥CurrentVersion¥Run malware=C:¥tmp¥malware.exe<br>DATA TYPE : REG_SZ |
| 7 | INTERNET | A | RECEIVE ATTACHED MAIL OF "FILE S" | D6 | ... |
| ... | ... | ... | ... | ... | ... |

FIG. 4

208 (ABSTRACT ATTACK TREE STORAGE UNIT)

| ABSTRACT ATTACK NAME | ATTACK METHOD ID LIST | STAGE OF ATTACK |
|---|---|---|
| DATA DESTRUCTION | [D1, ...] | ACTIONS ON OBJECTIVE |
| REMOTE ACCESS | [D2, D3, D4, ...] | REMOTE MANIPULATION |
| INTERNAL SEARCH | [...] | REMOTE MANIPULATION |
| INFECTION WITH MALWARE | [D5, ...] | INSTALLATION |
| RECEPTION OF MAIL WITH ATTACHED FILE | [D6, ...] | DELIVERY |

FIG. 5

209 (LOG CHECK MANAGEMENT INFORMATION STORAGE UNIT)

| ABSTRACT ATTACK NAME | DEVICE FOR WHICH LOG IS TO BE CHECKED | SPECIFIC PLACE IN THE LOG |
|---|---|---|
| DATA LEAKAGE | FireWall<br>WEB PROXY SERVER<br>DNS SERVER | ... |
| REMOTE ACCESS | FireWall | TRANSMISSION SOURCE/TRANSMISSION DESTINATION ADDRESS, TRANSMISSION DESTINATION PORT |
| INTERNAL SEARCH | FireWall | INDICATORS OF IP/PORT SCAN |
| INFECTION WITH MALWARE | CLIENT PC | Windows: EVENT LOG, Linux:audit.log |
| RECEPTION OF MAIL WITH ATTACHED FILE | MAIL SERVER | WRITTEN NAME DISPLAYED ON MAIL CLIENT, SENDER ADDRESS, ACTUAL MAIL SENDER ADDRESS, ATTACHED FILE NAME |

FIG. 6

211 (RECOVERY MEASURE INFORMATION STORAGE UNIT)

| RECOVERY WORK CONTENTS | RECOVERY WORK TIME |
|---|---|
| REGISTRY EDITING/ ONE PLACE | 2 MINUTES |
| FILE DELETION/ ONE FILE | 1 MINUTE |
| FILE RESTORATION/ ONE FILE | 10 MINUTES |
| REINSTALLATION OF SOFTWARE A | 15 MINUTES |
| INITIALIZATION OF OS | 60 MINUTES |
| ... | ... |

FIG. 9

ATTACK ESTIMATION DEVICE, ATTACK ESTIMATION METHOD, AND ATTACK ESTIMATION PROGRAM

CROSS REFERENCE TO RELATED APPLICATIONS

This application is a Continuation of PCT International Application No. PCT/JP2019/010044, filed on Mar. 12, 2019, which is hereby expressly incorporated by reference into the present application.

TECHNICAL FIELD

The present invention relates to an attack estimation device, an attack estimation method, and an attack estimation program in which a range of compromise from an attack on an analysis target system is estimated.

BACKGROUND ART

Changes occurring in recent years in circumstances that surround corporations bring about a diversity of risks new in nature to corporations, and leakage of important information, unauthorized access, a system failure, and other information security incidents that may lead to a trouble over information assets are a frequent occurrence.

In order to deal with the occurrence of information security incidents, in addition to security analysis performed in advance on a system to be protected, a system configured to detect an attack that leads to a trouble over information assets in anticipation of contingencies is desired. As a technology of assisting in taking a countermeasure for detecting such an attack, several technologies using an attack tree method have been proposed (see Non-Patent Literature 1, for example).

In security analysis, an asset value of and threats to a target are clarified, and a countermeasure is taken preferentially for an element having a high risk value. For that purpose, an attack tree is used to systematically extract an attack sequence from system configuration information of the target. There is the related art that presents a risk reduction measure by deriving attack trees of attacks on the system and thus exhaustively finding out vulnerable places (see Patent Literature 1, for example).

There is also the related art in which a rule for checking correlation between alerts output by an intrusion detection system (IDS) is automatically created based on an attack tree created by a specialist, and alerts of the IDS that may apply to nodes on the attack tree are associated, to thereby create a rule (see Non-Patent Literature 2, for example). There is also the related art that automatically generates an attack tree for use in a penetration test (see Patent Literature 2, for example).

Those technologies of the related art may possibly be applied to accomplish attack detection and infection site identification based on an attack tree, by automatically generating a detection rule that corresponds to a measure of attack, namely, an attack tree in which indicators of compromise (IOC) are defined, and by using the indicators of compromise.

However, exhaustiveness of an attack tree is not perfect in many aspects, and an actual threat cannot be identified through analysis in some cases. For example, in the case of an attack that utilizes unfound vulnerability, a measure of the attack does not exist at the time of analysis, and the tree accordingly does not include a path of the attack.

As one of methods of solving those problems, there has been proposed a related art that prevents erroneous omission of detection of a multistage attack by regarding, in an attack scenario for a multistage attack, an event that cannot be observed to be an observed event when events preceding and following that event are successfully observed (see Patent Literature 3, for example).

CITATION LIST

Patent Literature

[PTL 1] JP 5406195 B2
[PTL 2] US 9894090 B2
[PTL 3] JP 6000495 B2

Non Patent Literature

[NPL 1] B. Schneier: Attack trees: modeling security threats, Dr. Dobb's Journal, December 1999, URL: <https://www.schneier.com/academic/archives/1999/12/attack-_trees.html>

[NPL 2] Godefroy, Erwan, et al. "Automatic generation of correlation rules to detect complex attack scenarios." Information Assurance and Security (IAS), 2014 10th International Conference on. IEEE, 2014.

SUMMARY OF INVENTION

Technical Problem

The related art, however, has the following problem.
As described above, with attack trees, identification of an attack and an infection site is possible only for known patterns of attack.

The present invention has been made to solve the problem described above, and an object thereof is to obtain an attack estimation device, an attack estimation method, and an attack estimation program with which indicators of an attack of an unknown pattern can be estimated.

Solution to Problem

According to one embodiment of the present invention, there is provided an attack estimation device including: an attack tree storage unit configured to hold an attack tree in which an attack method assumed in advance in an analysis target system and indicators of compromise are associated with each other; an abstract attack tree storage unit configured to hold an abstract attack tree in which the attack method and an abstract attack name that is obtained by increasing a level of abstraction of the attack method are associated with each other; a log check management information storage unit configured to hold log check management information in which the abstract attack name, a device for which a log is to be checked, and a specific place in the log are associated with one another; and a prediction unit configured to predict, when a detection alert informing of occurrence of an attack on the analysis target system is received, a range of compromise from the attack by referring to the attack tree, the abstract attack tree, and the log check management information, wherein the prediction unit is configured to: identify, when the detection alert is received, the indicators of compromise that correspond to the attack by referring to the attack tree; determine that an attack of a known pattern has occurred as the attack when the indicators of compromise that correspond to the attack are successfully identified, and predict the range of compromise from the identified indicators of compromise; determine that an attack of an unknown pattern has occurred as the attack when the indicators of compromise that correspond to the attack are unsuccessfully identified; identify, when determining that the attack of an unknown pattern has occurred, the abstract attack name by referring to the abstract attack tree; and predict the range of compromise from the attack of an unknown pattern by identifying the device for which the log is to be checked as a device in which indicators of the attack of an unknown pattern are likely to be left, and identifying a specific place in the log of the identified device, by referring to the identified abstract attack name and the log check management information.

Further, according to one embodiment of the present invention, there is provided an attack estimation method including: a storage step of holding, in a storage unit, an attack tree in which an attack method assumed in advance in an analysis target system and indicators of compromise are associated with each other, an abstract attack tree in which the attack method and an abstract attack name that is obtained by increasing a level of abstraction of the attack method are associated with each other, and log check management information in which the abstract attack name, a device for which a log is to be checked, and a specific place in the log are associated with one another; and a prediction step of predicting, when a detection alert informing of occurrence of an attack on the analysis target system is received, a range of compromise from the attack by referring to the attack tree, the abstract attack tree, and the log check management information, wherein the prediction step includes: identifying, when the detection alert is received, the indicators of compromise that correspond to the attack by referring to the attack tree; determining that an attack of a known pattern has occurred as the attack when the indicators of compromise that correspond to the attack are successfully identified, and predicting the range of compromise from the identified indicators of compromise; determining that an attack of an unknown pattern has occurred as the attack when the indicators of compromise that correspond to the attack are unsuccessfully identified; identifying, when it is determined that the attack of an unknown pattern has occurred, the abstract attack name by referring to the abstract attack tree; and predicting the range of compromise from the attack of an unknown pattern by identifying the device for which the log is to be checked as a device in which indicators of the attack of an unknown pattern are likely to be left, and by identifying a specific place in the log of the identified device, by referring to the identified abstract attack name and the log check management information.

Further, according to one embodiment of the present invention, there is provided an attack estimation program for causing a computer to execute: a storage step of holding, in a storage unit, an attack tree in which an attack method assumed in advance in an analysis target system and indicators of compromise are associated with each other, an abstract attack tree in which the attack method and an abstract attack name that is obtained by increasing a level of abstraction of the attack method are associated with each other, and log check management information in which the abstract attack name, a device for which a log is to be checked, and a specific place in the log are associated with one another; and a prediction step of predicting, when a detection alert informing of occurrence of an attack on the analysis target system is received, a range of compromise from the attack by referring to the attack tree, the abstract attack tree, and the log check management information, wherein the prediction step includes: identifying, when the detection alert is received, the indicators of compromise that correspond to the attack by referring to the attack tree; determining that an attack of a known pattern has occurred as the attack when the indicators of compromise that correspond to the attack are successfully identified, and predicting the range of compromise from the identified indicators of compromise; determining that an attack of an unknown pattern has occurred as the attack when the indicators of compromise that correspond to the attack are unsuccessfully identified; identifying, when it is determined that the attack of an unknown pattern has occurred, the abstract attack name by referring to the abstract attack tree; and predicting the range of compromise from the attack of an unknown pattern by identifying the device for which the log is to be checked as a device in which indicators of the attack of an unknown pattern are likely to be left, and by identifying a specific place in the log of the identified device, by referring to the identified abstract attack name and the log check management information.

Advantageous Effects of Invention

According to the present invention, it is possible to obtain the attack estimation device, the attack estimation method, and the attack estimation program with which the indicators of the attack of the unknown pattern can be estimated.

BRIEF DESCRIPTION OF DRAWINGS

FIG. 4 is a table for showing a data structure of an attack tree held in an attack tree storage unit in the first embodiment of the present invention.

FIG. 5 is a table for showing a data structure of an abstract attack tree held in an abstract attack tree storage unit in the first embodiment of the present invention.

FIG. 6 is a table for showing a data structure of log check management information held in a log check management information storage unit in the first embodiment of the present invention.

FIG. 9 is a table for showing a data structure of recovery measure information which is held in a recovery measure information storage unit in the second embodiment of the present invention and which associates recovery work with a work time.

DESCRIPTION OF EMBODIMENTS

Referring to the accompanying drawings, an attack estimation device, an attack estimation method, and an attack estimation program according to preferred embodiments of the present invention is now described. The attack estimation device according to the present invention relates to a "device for estimating indicators of a cyber attack" that is capable of estimating indicators of a cyber attack of an unknown pattern. In the following description, "device for estimating indicators of a cyber attack" is simply referred to as "attack estimation device."

First Embodiment

Figure 1:
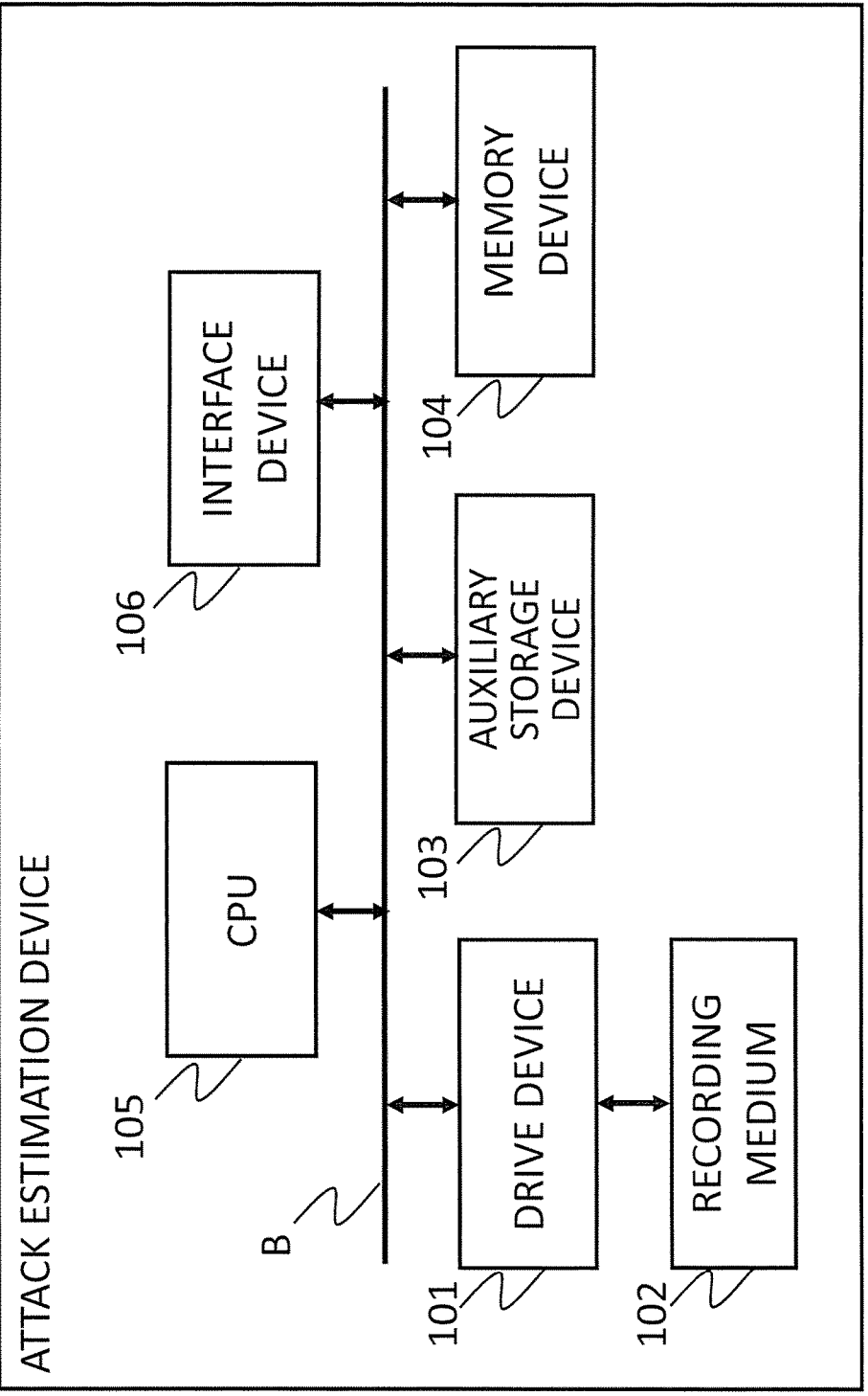
FIG. 1 is a diagram for illustrating a hardware configuration example of an attack estimation device according to a first embodiment of the present invention.

FIG. 1 is a diagram for illustrating a hardware configuration example of an attack estimation device according to a first embodiment of the present invention. In an attack estimation device 1 according to the first embodiment which is illustrated in FIG. 1, a drive device 101, an auxiliary storage device 103, a memory device 104, a CPU 105, and an interface device 106 are connected to one another by a bus B.

A program for implementing a series of processing steps of the attack estimation device 1 is provided on a recording medium 102 which is a CD-ROM or the like. When the recording medium 102 on which the program is stored is loaded in the drive device 101, the program is installed in the auxiliary storage device 103 from the recording medium 102 via the drive device 101.

The program, however, is not always required to be installed with the use of the recording medium 102, and may be downloaded from another computer via a network. The auxiliary storage device stores the installed program, and also stores a required file, data, and the like.

The memory device 104 reads the program out of the auxiliary storage device 103 and stores the program when an instruction to activate the program is issued. The CPU 105 which corresponds to a computer follows the program stored in the memory device 104 in executing functions of the attack estimation device 1. The interface device 106 is used as an interface for connecting to a network.

The attack estimation device 1 may be configured from a plurality of computers each of which has the hardware illustrated in FIG. 1. That is, processing executed by the attack estimation device 1 may be distributed among a plurality of computers to be executed by the plurality of computers.

Figure 2:
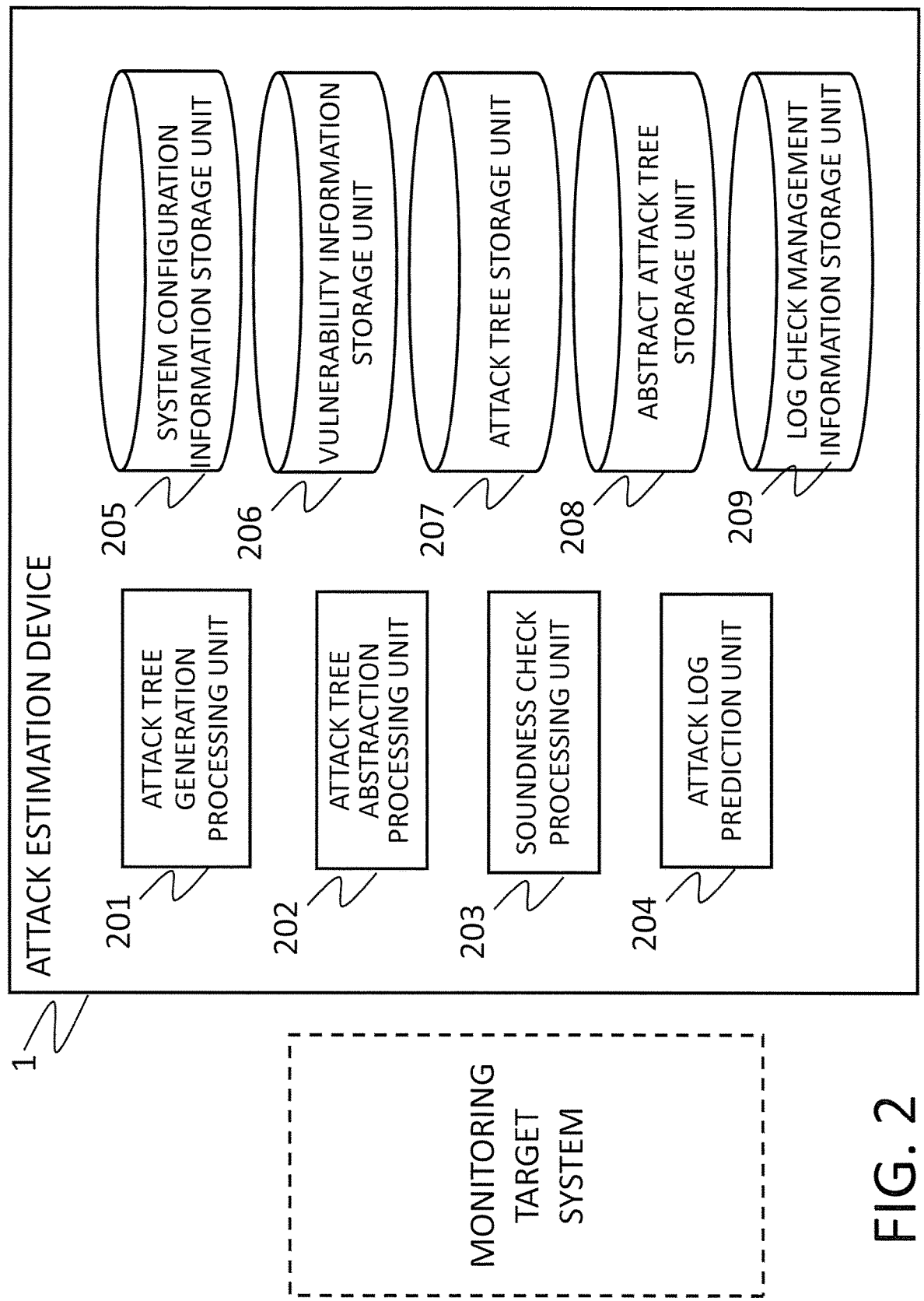
FIG. 2 is a diagram for illustrating a function configuration example of the attack estimation device according to the first embodiment of the present invention.

FIG. 2 is a diagram for illustrating a function configuration example of the attack estimation device 1 according to the first embodiment of the present invention. The attack estimation device illustrated in FIG. 2 includes an attack tree generation processing unit 201, an attack tree abstraction processing unit 202, a soundness check processing unit 203, an attack log prediction unit 204, a system configuration information storage unit 205, a vulnerability information storage unit 206, an attack tree storage unit 207, an abstract attack tree storage unit 208, and a log check management information storage unit 209.

Figure 3:
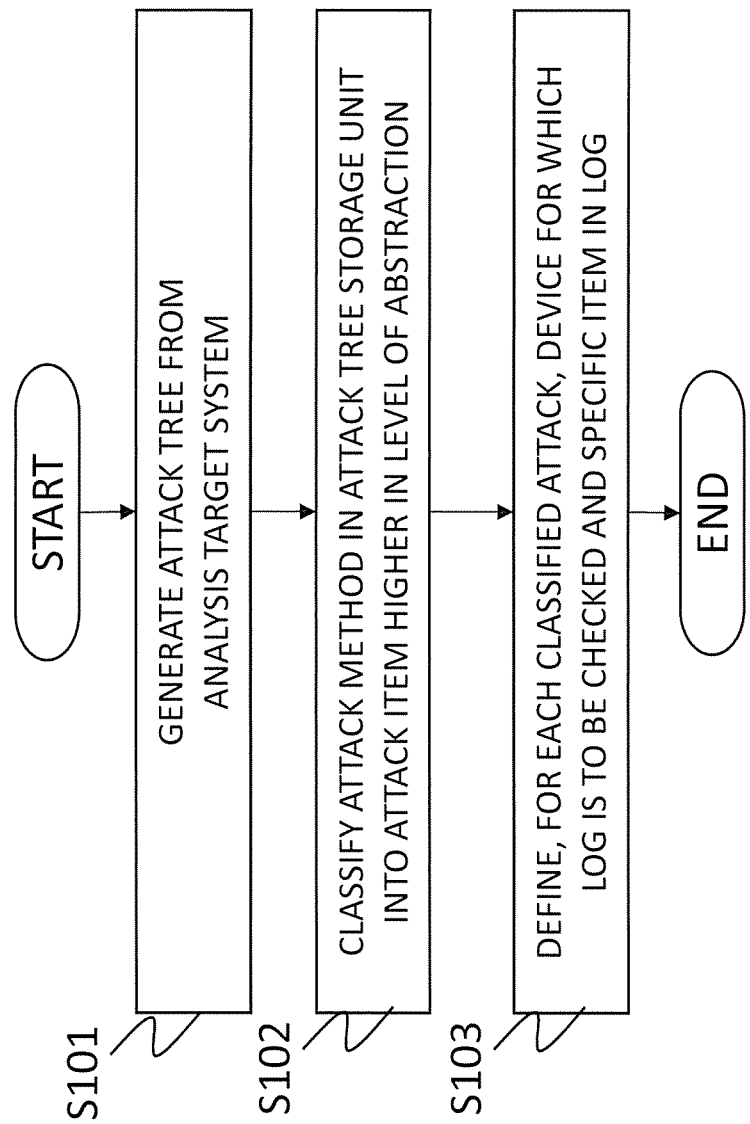
FIG. 3 is a flow chart for illustrating steps of creating data required to estimate indicators of a cyber attack in the attack estimation device according to the first embodiment of the present invention.

FIG. 3 is a flow chart for illustrating steps of creating data required to estimate indicators of a cyber attack in the attack estimation device 1 according to the first embodiment of the present invention. The steps of creating, in advance, data required to estimate indicators of compromise from a cyber attack is described with reference to FIG. 3. The system configuration information storage unit 205 stores data in which information of a system that is a target of analysis is described. The vulnerability information storage unit 206 stores data in which events that are threats to security are accumulated.

Processing of Step S101 to Step S103 described below corresponds to a storage step in which data required for attack estimation is stored in advance in the storage unit as a stage preceding attack estimation.

In Step S101, the attack tree generation processing unit 201 uses data stored in the system configuration information storage unit 205 and data stored in the vulnerability information storage unit 206 to generate an attack tree that associates a path of an attack, a facility expected to be attacked, an attack method, and vulnerability in an analysis target system with one another. The attack tree generation processing unit 201 stores the generated attack tree in the attack tree storage unit 207.

The processing of generating an attack tree and the processing of storing an attack tree can be accomplished by Patent Literatures 1 and 2 and Non-Patent Literature 2 cited as related-art literatures, and detailed descriptions thereof are therefore omitted.

FIG. 4 is a table for showing a data structure of an attack tree held in the attack tree storage unit 207 in the first embodiment of the present invention. As shown in FIG. 4, pieces of data that are "ID", "from", "to", "attack method", "attack method ID", and "indicators of compromise (IOC)" are associated with one another to be held as an attack tree in the attack tree storage unit 207.

A path of an attack and a facility expected to be attacked in an analysis target system are identified from pieces of information about "from" and "to" that are shown as an attack tree. Vulnerability of an attacked site is identified from "indicators of compromise (IOC)" shown as an attack tree.

An attack tree derived by the attack tree generation processing unit 201 based on information of the system configuration information storage unit 205 and the vulnerability information storage unit 206 holds IOC being indicators of compromise as shown in FIG. 4.

To give an example, an entry for the ID "5" of FIG. 4 indicates that, when a threat from an attack using software vulnerability Z and an attack method that has "D4" as the attack method ID occurs from Facility A to Facility D, IOC thereof includes the name of software containing the vulnerability, a version, information of a file path serving as an indicator, and others.

IOC being indicators of compromise is a compilation of pieces of information left as indicators in a facility from an attack that uses one of the attack methods shown in FIG. 4. Indicators of an attack that has a known pattern as those compiled in FIG. 4 can therefore be identified by referring to the indicators of compromise.

Next, in Step S102, the attack tree abstraction processing unit 202 classifies the attack method of the attack tree held in the attack tree storage unit 207 into an attack item higher in the level of abstraction. The attack tree abstraction processing unit 202 stores an abstract attack tree obtained through the classification in the abstract attack tree storage unit 208.

FIG. 5 is a table for showing a data structure of an abstract attack tree held in the abstract attack tree storage unit 208 in the first embodiment of the present invention. In the abstract attack tree storage unit 208, attack methods held in the attack tree storage unit 207 are classified into attack items higher in the level of abstraction, and stored as data shown in FIG. 5.

Specifically, pieces of data that are "abstract attack name," "attack method ID list," and "stage of the attack" are associated with one another to be held as an abstract attack tree in the abstract attack tree storage unit 208 as shown in FIG. 5.

As shown in FIG. 4, data of an attack tree held in the attack tree storage unit 207 is finely classified by the vulnerability of a facility and IOC provided for each attack method ID. The attack tree abstraction processing unit 202, on the other hand, classifies an attack method into an attack item that is one level higher in the level of abstraction by, for example, classifying attack methods into stages of attack according to a cyber kill chain.

The cyber kill chain is a framework in which moves of an attacker, namely, stages of attack, are classified into stages. Specifically, moves of an attacker are classified into the following stages (processes): "reconnaissance", "weaponization", "delivery", "exploitation", "installation", "remote manipulation (command and control: C & C)", "lateral movement", and "actions on objective".

To give an example, data corresponding to an attack method ID that is "D4" on the "attack method ID list" of FIG. 5 is stored with remote access as the "abstract attack name" and remote manipulation of the "stage of attack."

Next, in Step S103, the attack tree abstraction processing unit 202 defines, for each abstract attack name classified in the abstract attack tree storage unit 208, a device for which the log is to be checked and a specific place in the log. The attack tree abstraction processing unit 202 stores the defined data as log check management information in the log check management information storage unit 209.

FIG. 6 is a table for showing a data structure of the log check management information held in the log check management information storage unit 209 in the first embodiment of the present invention. In the log check management information storage unit 209, pieces of data itemized as "device for which the log is to be checked" and "specific place in the log" are associated with "abstract attack name" to be stored as the log check management information.

The phrase "device for which the log is to be checked" means a device in which an indicator of an attack corresponding to the abstract attack name is likely to be left. The "specific place in the log" defines a specific log item in the log of the "device for which the log is to be checked."

Figure 7:
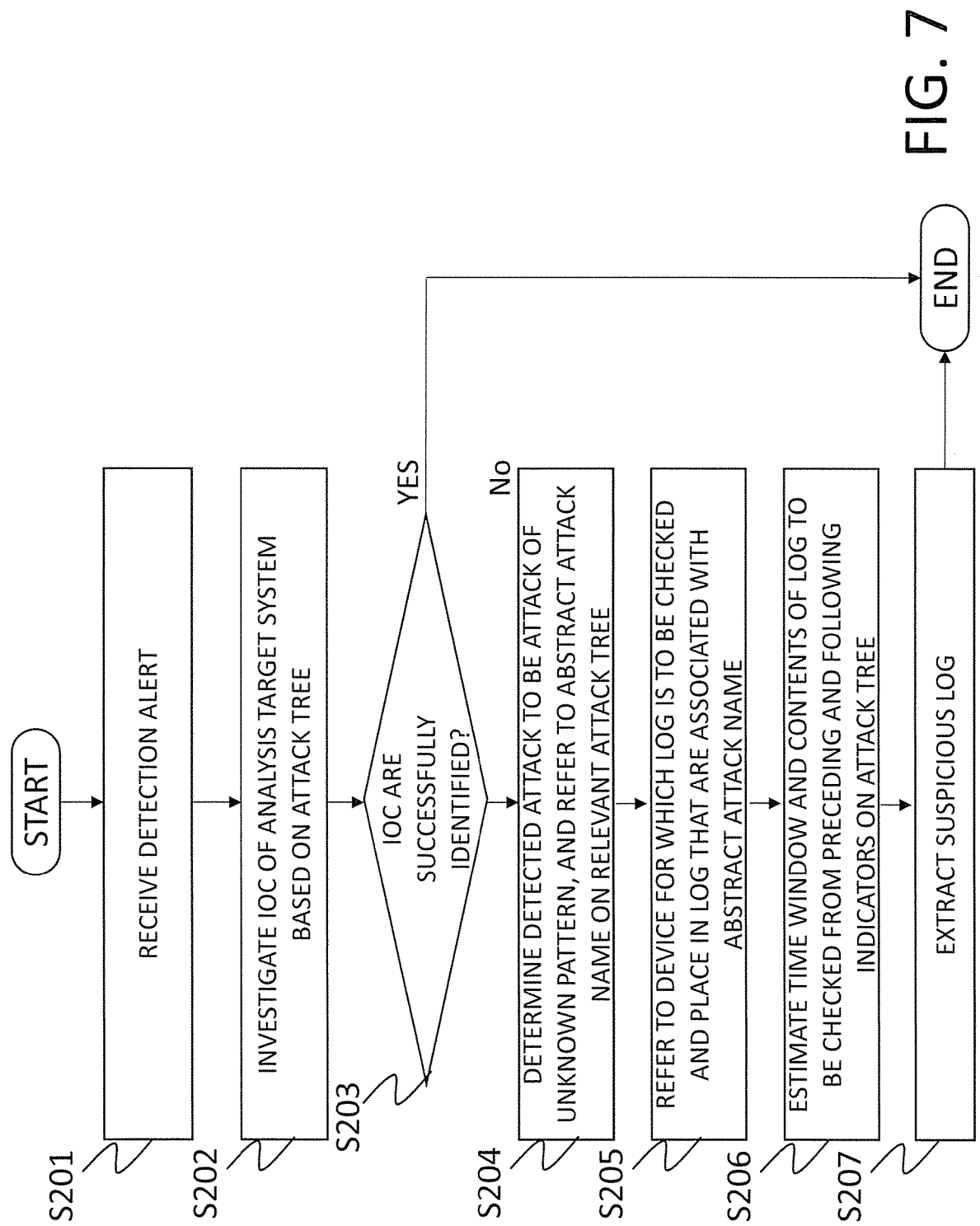
FIG. 7 is a flow chart for illustrating a series of operation steps of an attack estimation method to be executed in the attack estimation device according to the first embodiment of the present invention.

Processing of estimating a cyber attack of an unknown pattern that is executed by the attack estimation device according to the first embodiment is described next with reference to FIG. 7. FIG. 7 is a flow chart for illustrating a series of operation steps of an attack estimation method to be executed in the attack estimation device according to the first embodiment of the present invention.

Processing of Step S201 to Step S207 described below corresponds to a prediction step in which attack estimation is executed. The soundness check processing unit 203 and the attack log prediction unit 204 which execute the processing of Step S201 to Step S207 correspond to the prediction unit.

First, in Step S201, the soundness check processing unit 203 receives a detection alert when a cyber attack occurs.

Next, in Step S202, the soundness check processing unit 203 investigates whether there is IOC associated with a facility of an analysis target system, based on attack trees stored in the attack tree storage unit 207.

To give an example, in an entry for the ID "5" of FIG. 4, when there is a threat of occurrence of an attack using the software vulnerability Z from Facility A to Facility D, and IOC thereof includes the name of software containing the vulnerability, a version, information of a file path serving as an indicator, and others. The soundness check processing unit 203 checks whether the IOC are present in Facility D. When the IOC are present in Facility D, that is, when indicators of compromise are successfully identified, it can be regarded that an attack of a tree in that place has been established.

In Step S203, the soundness check processing unit 203 accordingly determines whether IOC have successfully been identified as a result of the investigation. When a path of attack of an attack tree is established, that is, when IOC with which a path of attack is established are present, the soundness check processing unit 203 determines that the attack is of a known pattern, not of an unknown pattern, and ends the series of processing steps.

When IOC are not found for one path of attack of an attack tree, the soundness check processing unit 203 determines that a known attack method is not established and that an attack of an unknown pattern has been delivered instead, and proceeds to processing of Step S204 and subsequent steps.

In Step S204, the attack log prediction unit 204 identifies an abstract attack name for the relevant attack tree by referring to abstract attack trees stored in the abstract attack tree storage unit 208.

In Step S205, the attack log prediction unit 204 identifies a "device for which the log is to be checked" and a "specific place in the log" by referring to a piece of the log check management information that is stored in the log check management information storage unit 209 in association with the "abstract attack name." That is, the attack log prediction unit 204 identifies a "device for which the log is to be checked" as a device in which indicators of an attack of an unknown pattern are likely to be left, and identifies a "specific place in the log" in association with the identified device, to thereby predict a range of compromise by an attack of an unknown pattern.

For example, an entry for the ID "5" of FIG. 4 has "D4" as the attack method ID. The attack log prediction unit 204 can accordingly identify remote access as the "abstract attack name" by referring to an abstract attack tree shown in FIG. 5. The attack log prediction unit 204 can further identify a firewall as the "device for which the log is to be checked" that is relevant to remote access, and a transmission source/transmission destination address or a transmission destination port as the "specific place in the log" by referring to the log check management information shown in FIG. 6.

Next, in Step S206, the attack log prediction unit 204 estimates a time window of the log to be checked from preceding and following indicators on the attack tree. For example, an attack of the ID "5" which is assumed to be an attack of unknown pattern in FIG. 4 has the ID "6" and the ID "3" as preceding and following IDs on the attack tree. From information on timestamps of the IOC for the ID "6" and the IOC for the ID "3" that have been identified through investigation by the soundness check processing unit 203, it can be estimated that the attack of the ID "5" has been delivered in a time window between the timestamps.

Next, in Step S207, the attack log prediction unit 204 extracts, as a suspicious log, a log in the time window estimated in Step S206 with respect to the "device for which the log is to be checked" that is associated with the abstract attack name, and ends the series of processing steps.

The attack estimation device 1 can predict a range of compromise from an attack for an attack of a base and an attack of an unknown pattern both by executing the series of processing steps illustrated in the flow chart of FIG. 7.

When "from" and "to" of an attack method of FIG. 4 are different, that is, in the case of an attack on another device, the attack log prediction unit 204 can narrow down suspicious logs by cross-referencing logs in the time window with logs of a transmission source facility and a transmission destination facility that are estimated to have been attacked.

As a method of determining whether there is an unauthorized log by an attack of an unknown pattern, the attack log prediction unit 204 may use an "abnormal behavior detection technology" for determining whether there is a normal log that has a pattern different from a normal pattern, or a similar technology.

As described above, the attack estimation device according to the first embodiment can estimate indicators of an attack of an unknown pattern. The attack estimation device according to the first embodiment can also avoid erroneously determining an attack for which IOC are not successfully identified in a path of attack of an attack tree as an attack of a known pattern.

Second Embodiment

Figure 8:
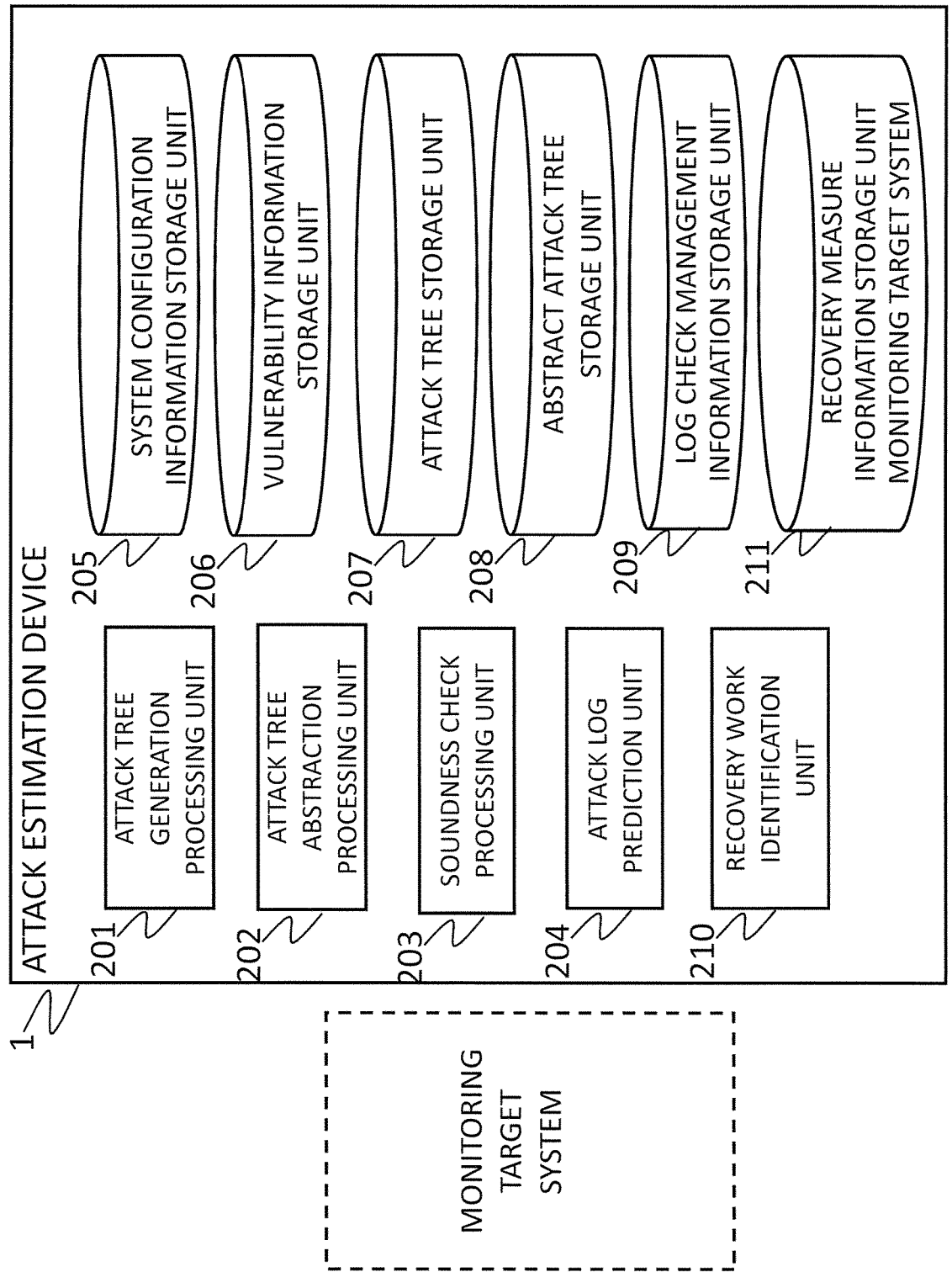
FIG. 8 is a function configuration example of an attack estimation device according to a second embodiment of the present invention.

FIG. 8 is a function configuration example of an attack estimation device 1 according to a second embodiment of the present invention. The attack estimation device illustrated in FIG. 8 further includes, in addition to the components of FIG. 2 which are described above in the first embodiment, a recovery work identification unit 210 and a recovery measure information storage unit 211. The following description focuses on functions of the recovery work identification unit 210 and the recovery measure information storage unit 211 which are newly added components.

In the foregoing first embodiment, an infection site can be estimated in the event of cyber attacks including an attack of an unknown pattern. In actual running, however, recovery work is required to be performed in the range of compromise after estimation work is performed. The description of the second embodiment therefore deals with the attack estimation device 1 that has an additional function of capable of predicting steps and a time that are required for recovery of the entire system, based on IOC of an estimated infection site.

The recovery measure information storage unit 211 is configured to hold contents of recovery work in the range of compromise and a recovery work time required for restoration, in relation to information defined in IOC of the attack tree storage unit 207. The recovery work time is a work time required for recovery to an original state when, for example, a registry is rewritten by an attack.

FIG. 9 is a table for showing a data structure of recovery measure information which is held in the recovery measure information storage unit 211 in the second embodiment of the present invention and which associates contents of recovery work with a recovery work time. Instead of defining a plurality of recovery work times based on IOC, a recovery work time of recovery work having only one step that is recovery from regular backup may be defined as recovery measure information.

Reinstallation of installed software, initialization of an OS, rebooting of a device, and the like may be required depending on the type of attack. Times required for those types of work are defined in the recovery measure information storage unit 211 and the system configuration information storage unit 205 between which the defined times are distributed.

To give an example, the system configuration information storage unit 205 may hold software installed in each facility, facility performance information, a dependence relationship between facilities, and other types of data used in identification of a recovery work time.

The recovery work identification unit 210 is configured to refer to information stored in the system configuration information storage unit 205, the attack tree storage unit 207, and the recovery measure information storage unit 211 that is required to identify a recovery work time, in order to restore indicators of attacks including an attack of an unknown pattern that are identified through the series of processing steps in the foregoing first embodiment. Specifically, the recovery work identification unit 210 determines an order of executing recovery of facilities, shutdown of a dependent device, whether activation processing is required, and the like from a length of time required for restoration of IOC and from a dependence relationship between facilities.

For example, when the dependence relationship between facilities is expressed with a directed graph, the recovery work identification unit 210 can identify a recovery work time by the following steps. A rule prescribing that, when restoration involving shutdown of one facility is executed, dependent facilities adjacent to the one facility in the graph be shut down first is set here. The recovery work identification unit 210 can figure out recovery steps by deriving steps of restoring all facilities based on the directed graph which follows this rule, and identify the sum of restoration times in the recovery steps as a recovery work time.

As described above, the attack estimation device according to the second embodiment can not only estimate indicators of a cyber attack of an unknown pattern but also predict and identify a time required to recover from damage wrought by the attack from identified indicators of the attack.

Features of the attack estimation devices according to the first and second embodiments described above are summarized as follows. The attack estimation devices according to the first and second embodiments can identify a range of compromise from a sophisticated cyber attack on a corporation that is centered around a targeted attack, and can estimate work and a time that are required for recovery.

Specifically, the attack estimation devices according to the first and second embodiments generate, in advance, an attack tree in which possible attack activities in an analysis target system and corresponding indicators of compromise are exhaustively described. After detecting an attack, the attack estimation devices according to the first and second embodiments identifies a path of attack by investigating indicators of an attack in each facility along the attack tree.

In the case of an attack of an unknown pattern, there is a possibility of a failure to find IOC through an attack tree analysis beforehand and a resultant failure to identify the range of compromise. The attack estimation devices according to the first and second embodiments deal with attack activities for which IOC cannot be confirmed on the attack tree by identifying a log of a device, a time window, and a place in the log in which indicators of an attack are likely to be left, under the assumption that an attack of the same type and of an unknown pattern has been delivered.

As a result, the attack estimation device according to the first embodiment can identify a range of compromise even when an attack of an unknown pattern occurs. The attack estimation device according to the second embodiment can estimate work and a time that are required for recovery of a range identified to be compromised, in addition to providing the effects of the attack estimation device according to the first embodiment.

REFERENCE SIGNS LIST 1 attack estimation device, 101 drive device, 102 recording medium, 103 auxiliary storage device, 104 memory device, 105 CPU, 106 interface device, 201 attack tree generation processing unit, 202 attack tree abstraction processing unit, 203 soundness check processing unit, 204 attack log prediction unit, 205 system configuration information storage unit, 206 vulnerability information storage unit, 207 attack tree storage unit, 208 abstract attack tree storage unit, 209 log check management information storage unit, 210 recovery work identification unit, 211 recovery measure information storage unit

The invention claimed is:

1. An attack estimation device, comprising:
an attack tree storage memory, which is non-transitory computer-readable memory, to hold an attack tree in which an attack method assumed in advance in an analysis target system and indicators of compromise are associated with each other;
an abstract attack tree storage memory, which is non-transitory computer-readable memory, to hold an abstract attack tree in which the attack method and an abstract attack name that is obtained by generalizing the attack method are associated with each other;
a log check management information storage memory, which is non-transitory computer-readable memory, to hold log check management information in which the abstract attack name, a device for which a log is to be checked, and a specific place in the log are associated with one another; and
a predicting circuitry to predict, when a detection alert informing of occurrence of an attack on the analysis target system is received, a range of compromise from the attack by referring to the attack tree, the abstract attack tree, and the log check management information,
wherein the predicting circuitry is configured to:
identify, when the detection alert is received, the indicators of compromise that correspond to the attack by referring to the attack tree;
determine that an attack of a known pattern has occurred as the attack when the indicators of compromise that correspond to the attack are successfully identified, and predict the range of compromise from the identified indicators of compromise;
determine that an attack of an unknown pattern has occurred as the attack when the indicators of compromise that correspond to the attack are unsuccessfully identified;
identify, when determining that the attack of the unknown pattern has occurred, the abstract attack name by referring to the abstract attack tree; and
predict the range of compromise from the attack of the unknown pattern by identifying the device for which the log is to be checked as a device in which indicators of the attack of the unknown pattern are anticipated, and identifying a specific place in the log of the identified device, by referring to the identified abstract attack name and the log check management information.

2. The attack estimation device according to claim 1, further comprising:
a recovery measure information storage memory, which is non-transitory computer-readable memory, to hold recovery measure information in which contents of recovery work in the range of compromise and a recovery work time are associated with each other; and
a recovery work identifying circuitry to identify the contents of recovery work and the recovery work time that are required for restoration of the range of compromise predicted by the predicting circuitry, by referring to the recovery measure information.

3. An attack estimation method, comprising:
a storage step of holding, in a storage memory, which is non-transitory computer-readable memory, an attack tree in which an attack method assumed in advance in an analysis target system and indicators of compromise are associated with each other, an abstract attack tree in which the attack method and an abstract attack name that is obtained by generalizing the attack method are associated with each other, and log check management information in which the abstract attack name, a device for which a log is to be checked, and a specific place in the log are associated with one another; and
a prediction step of predicting, when a detection alert informing of occurrence of an attack on the analysis target system is received, a range of compromise from the attack by referring to the attack tree, the abstract attack tree, and the log check management information,
wherein the prediction step includes:
identifying, when the detection alert is received, the indicators of compromise that correspond to the attack by referring to the attack tree;
determining that an attack of a known pattern has occurred as the attack when the indicators of compromise that correspond to the attack are successfully identified, and predicting the range of compromise from the identified indicators of compromise;
determining that an attack of an unknown pattern has occurred as the attack when the indicators of compromise that correspond to the attack are unsuccessfully identified;
identifying, when it is determined that the attack of the unknown pattern has occurred, the abstract attack name by referring to the abstract attack tree; and
predicting the range of compromise from the attack of the unknown pattern by identifying the device for which the log is to be checked as a device in which indicators of the attack of the unknown pattern are anticipated, and by identifying a specific place in the log of the identified device, by referring to the identified abstract attack name and the log check management information.

4. A non-transitory computer-readable medium storing an attack estimation program for causing a computer to execute:
a storage step of holding, in a non-transitory storage memory, an attack tree in which an attack method assumed in advance in an analysis target system and indicators of compromise are associated with each other, an abstract attack tree in which the attack method and an abstract attack name that is obtained by generalizing the attack method are associated with each other, and log check management information in which the abstract attack name, a device for which a log is to be checked, and a specific place in the log are associated with one another; and
a prediction step of predicting, when a detection alert informing of occurrence of an attack on the analysis target system is received, a range of compromise from the attack by referring to the attack tree, the abstract attack tree, and the log check management information,
wherein the prediction step includes:

identifying, when the detection alert is received, the indicators of compromise that correspond to the attack by referring to the attack tree;

determining that an attack of a known pattern has occurred as the attack when the indicators of compromise that correspond to the attack are successfully identified, and predicting the range of compromise from the identified indicators of compromise;

determining that an attack of an unknown pattern has occurred as the attack when the indicators of compromise that correspond to the attack are unsuccessfully identified;

identifying, when it is determined that the attack of the unknown pattern has occurred, the abstract attack name by referring to the abstract attack tree; and predicting the range of compromise from the attack of the unknown pattern by identifying the device for which the log is to be checked as a device in which indicators of the attack of the unknown pattern are anticipated, and by identifying a specific place in the log of the identified device, by referring to the identified abstract attack name and the log check management information.

\* \* \* \* \*